US012640526B2

(12) United States Patent
Daoust

(10) Patent No.: US 12,640,526 B2
(45) Date of Patent: May 26, 2026

(54) CONNECTOR WITH BIASING MEMBER CONFIGURED TO MAINTAIN A GROUND PATH

(71) Applicant: PPC BROADBAND, INC., East Syracuse, NY (US)

(72) Inventor: Daniel Daoust, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 354 days.

(21) Appl. No.: 18/141,155

(22) Filed: Apr. 28, 2023

(65) Prior Publication Data

US 2023/0352889 A1 Nov. 2, 2023

Related U.S. Application Data

(60) Provisional application No. 63/336,393, filed on Apr. 29, 2022.

(51) Int. Cl.
*H01R 24/40* (2011.01)
*H01R 9/05* (2006.01)
*H01R 43/20* (2006.01)

(52) U.S. Cl.
CPC ........... *H01R 24/40* (2013.01); *H01R 9/0512* (2013.01); *H01R 9/0521* (2013.01); *H01R 43/20* (2013.01)

(58) Field of Classification Search
None
See application file for complete search history.

(56) References Cited

U.S. PATENT DOCUMENTS 5,322,454 A 6/1994 Thommen
11,923,649 B2 * 3/2024 Volkov .................. H01R 24/40
2009/0181575 A1 7/2009 Hung
2010/0297871 A1 11/2010 Haube
2014/0127941 A1 5/2014 Lu

FOREIGN PATENT DOCUMENTS

CN 202444064 U 9/2012
KR 20210134235 A 11/2021

OTHER PUBLICATIONS

International Search Report and Written Opinion in corresponding International Application No. PCT/US2023/020425, dated Aug. 2, 2023, 15 pages.

* cited by examiner

*Primary Examiner* — Ross N Gushi
(74) *Attorney, Agent, or Firm* — MH2 TECHNOLOGY LAW GROUP LLP

(57) ABSTRACT

A cable connector includes: a back portion comprising a rearward end and a forward end opposite the rearward end; a conductive portion configured to be supported within the back portion and comprising a rearward end portion; and a biasing portion configured to be received by the conductive portion. In an assembled state, the biasing portion is configured to be compressed in an axial direction between the conductive portion and the back portion; and the biasing portion is configured to urge the conductive portion into contact with a front assembly to provide a secure electrical grounding path between the conductive portion and the front assembly.

28 Claims, 9 Drawing Sheets

CONNECTOR WITH BIASING MEMBER CONFIGURED TO MAINTAIN A GROUND PATH

CROSS-REFERENCE TO RELATED APPLICATION

This application claims the benefit of U.S. Provisional Application No. 63/336,393 filed Apr. 29, 2022, the disclosure of which is hereby incorporated by reference herein in its entirety.

BACKGROUND

The present invention relates generally to connectors for terminating coaxial cable. More particularly, the present invention relates to axially compressible connectors that are configured to maintain a ground path, such as hardline or semi-rigid coaxial cable connectors.

Various types of cables are commonly used in the cable television industry to carry cable TV signals to television sets in homes, businesses, and other locations. For instance, a hardline coaxial cable may be used to carry the signals in distribution systems exterior to these locations and a flexible coaxial cable is then often used to carry the signals within the interior of these locations. Hardline or semi-rigid coaxial cable also may be used where a high degree of radio-frequency (RF) shielding is required.

A hardline cable may include a solid wire core or inner conductor, typically of copper or copper-clad aluminum, surrounded by a solid tubular outer conductor. The outer conductor may be made of copper or aluminum. Dielectric material or insulation may separate the inner and outer conductors. The outer conductor may be covered with a cable jacket or sheath of plastic to provide protection against corrosion and weathering.

Threaded cable connectors may be employed to provide even compression of the connector. Such connectors may utilize some form of clamping mechanism that radially compresses the outer conductor of the cable against a tubular post or mandrel upon axial threaded movement of the connector components to retain the cable in the hardline connector. The clamping mechanism may include a conical sleeve surrounded by an outer sleeve which forces the conical sleeve to radially compress upon axial movement of the outer sleeve with respect to the conical sleeve. The length of the conical closure sleeve may close the full length of the mechanism with equal forces around the circumference of the mandrel. The resulting forces may close down on the coaxial cable compress the cable around the outside of the mandrel creating a formed bond on the outside surface.

The above referenced, and other, connectors may provide an electrically conductive connection between the outer conductor of the coaxial cable and a front nut of the connector. However, this electrically conductive connection may be compromised by a poor contact between internal parts of the front nut and/or a back nut.

It may be desirable to provide a coaxial connector having a biasing ring that may be configured to urge the mandrel into contact with the front nut housing to provide a secure electrical grounding path between the mandrel and the front nut housing.

SUMMARY

Embodiments of the disclosure include an improved electrically conductive connection between the mandrel and the front nut housing as a result of the biasing ring maintaining secure contact between the mandrel and the front nut housing.

According to aspects of the disclosure, a cable connector may include: a back housing that may comprise a rearward cable receiving end and a forward end opposite the rearward end; a front assembly that may be configured to be coupled with the forward end of the back housing; a tubular metal portion that may be configured to be supported within the back housing and that may comprise a rearward end portion; a biasing portion that may be configured to be received in a recess in an outer surface of the tubular metal portion; wherein the biasing portion may comprise a plurality of tubular metal portion contacting sections and a plurality of back housing contacting sections; wherein the back housing may comprise an annular lip that may be configured to protrude inwardly from an inner surface of the back housing; wherein the tubular metal portion may comprise a radial extension that may be configured to extend outwardly from a surface of the tubular metal portion; wherein, in an assembled state, the biasing portion may be configured to be compressed in an axial direction between the radial extension and the annular lip; wherein, in the assembled state, the biasing portion may be configured to radially center the tubular metal portion in the back housing; and wherein the biasing portion may be configured to urge the tubular metal portion into contact with the front assembly to provide a secure electrical grounding path between the tubular metal portion and the front assembly.

In some embodiments, the tubular metal portion may comprise a mandrel.

In some embodiments, the cable connector may comprise a coaxial cable connector.

In some embodiments, the biasing portion may comprise a biasing ring.

In some embodiments, the back housing may comprise a back nut housing.

In some embodiments, the front assembly may comprise a front nut assembly.

In some embodiments, the gripping portion may comprise a tubular gripping ferrule.

In some embodiments, the holder portion may comprise a tubular holder sleeve.

In some embodiments, the recess may comprise a groove.

In some embodiments, a compression assembly may be configured to radially compress an outer conductor of a cable against the tubular metal portion.

In some embodiments, the compression assembly may comprise a gripping portion that may be configured to radially surround the tubular metal portion and a holder portion that may be configured to radially surround at least a portion of the gripping portion.

In some embodiments, the biasing portion may be configured to provide a secure electrical grounding path between the tubular metal portion and the front assembly when the front assembly is loosely coupled to the back housing, and when the front assembly is fully tightened to the back housing.

According to aspects of the disclosure, a cable connector may include: a back portion that may comprise a rearward cable receiving end and a forward end opposite the rearward end; a tubular metal portion that may be configured to be supported within the back portion and may comprise a rearward end portion; a biasing portion that may be configured to be received by a receiving portion in the tubular metal portion; wherein the back portion may comprise a retaining portion; wherein the tubular metal portion may comprise an extension portion that may be configured to extend outwardly from the tubular metal portion; wherein, in an assembled state, the biasing portion may be configured to be compressed in an axial direction between the extension portion and the retaining portion; and wherein the biasing portion may be configured to urge the tubular metal portion into contact with a front assembly to provide a secure electrical grounding path between the tubular metal portion and the front assembly.

Some embodiments may further comprise a front assembly that may be configured to be coupled with the forward end of the back portion.

In some embodiments, the back portion may comprise a back nut housing, and the front assembly may comprise a front nut assembly.

In some embodiments, the biasing portion may be configured to provide a secure electrical grounding path between the tubular metal portion and the front assembly when the front assembly is loosely coupled to the back portion, and when the front assembly is fully tightened to the back portion.

In some embodiments, the biasing portion may be configured to comprise a plurality of tubular metal portion contacting sections and a plurality of back portion contacting sections.

In some embodiments, the receiving portion may be configured to be located in an outer surface of the tubular metal portion.

In some embodiments, the retaining portion may comprise an annular lip tha may be configured to protrude inwardly from an inner surface of the back portion.

In some embodiments, the extension portion may comprise a radial extension.

In some embodiments, in the assembled state, the biasing portion may be configured to radially center the tubular metal portion in the back portion.

According to aspects of the disclosure, a cable connector may include: a back portion that may comprise a rearward end and a forward end opposite the rearward end; a conductive portion that may be configured to be supported within the back portion and that may comprise a rearward end portion; a biasing portion that may be configured to be received by the conductive portion; wherein, in an assembled state, the biasing portion may be configured to be compressed in an axial direction between the conductive portion and the back portion; and wherein the biasing portion may be configured to urge the conductive portion into contact with a front assembly to provide a secure electrical grounding path between the conductive portion and the front assembly.

In some embodiments, the back portion may comprise a retaining portion, and the conductive portion may comprise an extension portion that may be configured to extend outwardly from the conductive portion.

In some embodiments, in the assembled state, the biasing portion may be configured to be compressed in an axial direction between the extension portion and the retaining portion.

In some embodiments, the biasing portion may be configured to comprise a plurality of conductive portion contacting sections and a plurality of back portion contacting sections.

In some embodiments, the conductive portion may comprise a tubular metal portion.

In some embodiments, the biasing portion may be configured to provide a secure electrical grounding path between the conductive portion and the front assembly when the front assembly is loosely coupled to the back portion, and when the front assembly is fully tightened to the back portion.

In some embodiments, the biasing portion comprises a biasing ring.

In some embodiments, the back portion comprises a back nut housing.

In some embodiments, the front assembly comprises a front nut assembly.

Although embodiments of the disclosure are described with reference to a hardline connector, the features of the disclosure are also applicable to flexible coaxial cable connectors.

Various aspects of the hardline coaxial connector, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

A connector in accordance with embodiments of the disclosure has a biasing ring that may be configured to urge a mandrel of the connector into contact with a front nut housing of the connector to provide a secure electrical grounding path between the mandrel and the front nut housing.

Figure 1:
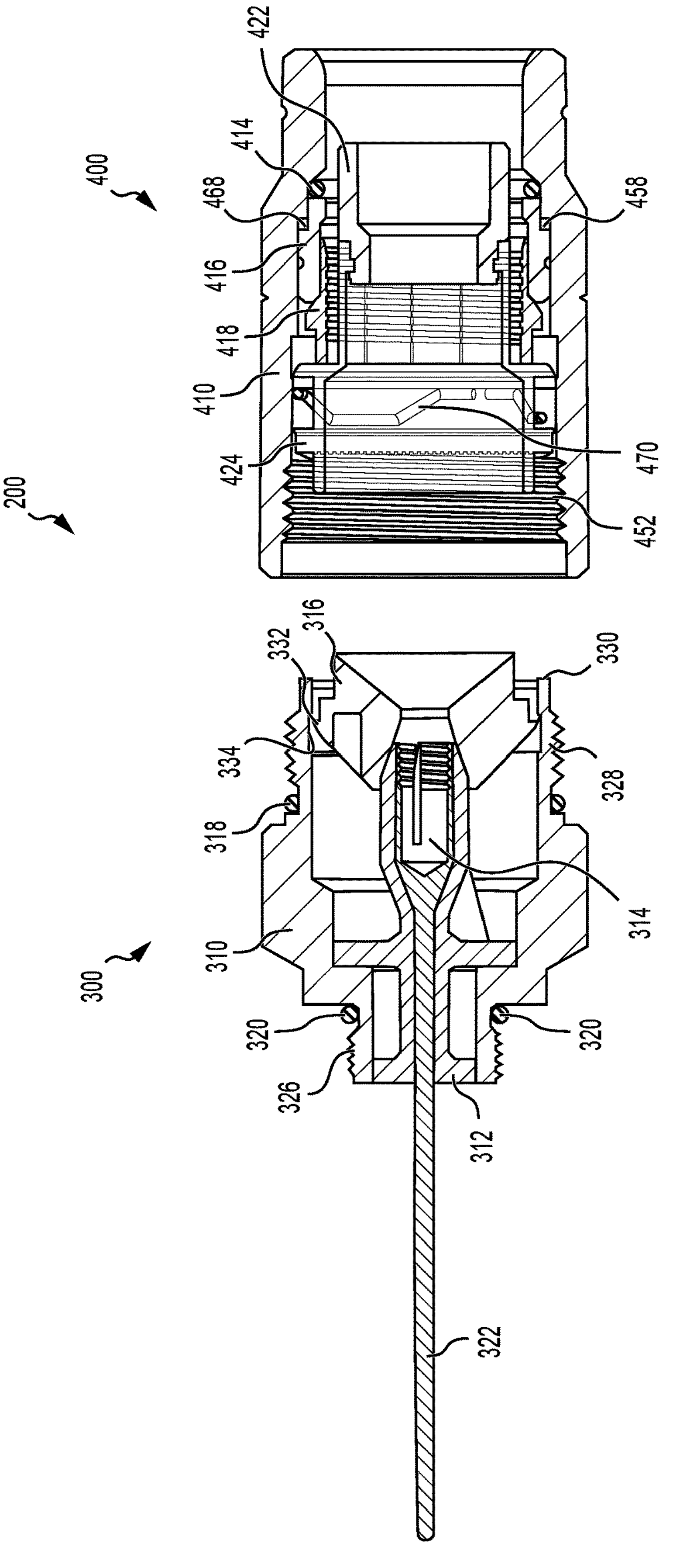
FIG. 1 is a side cross-sectional view of an exemplary hardline connector in a separated state in accordance with various aspects of the disclosure.

Referring FIG. 1, an exemplary connector 200 is depicted. The connector 200 is configured for hardline or semi-rigid coaxial cables. In this example, the connector 200 includes a front assembly, for example a front nut assembly 300 and a back portion, for example a back nut assembly 400 that are configured to be removably connected to one another while providing both an electrical and mechanical connection therebetween.

A coaxial cable (not shown), for example, a hardline coaxial cable, is inserted into the rearward end of the back nut assembly 400 of the connector 200. Coaxial cables generally include a solid center conductor typically formed from a conductive metal, such as copper, copper clad aluminum, copper clad steel, or the like capable of conducting electrical signals therethrough. Surrounding the cable center conductor is a cable dielectric, which insulates the cable center conductor to minimize signal loss. The cable dielectric also maintains a spacing between the cable center conductor and a cable outer conductor or shield. The cable dielectric is often a plastic material, such as a polyethylene, a fluorinated plastic material, such as a polyethylene or a polytetrafluoroethylene, a fiberglass braid, or the like. The cable shield or outer conductor is typically made of metal, such as aluminum or copper, and is often extruded to form a hollow tubular structure with a solid wall having a smooth exterior surface. An insulative cable jacket may surround the cable outer conductor to further seal the coaxial cable. The cable jacket is typically made of plastic, such as polyvinylchloride, polyethylene, polyurethane, or polytetrafluoroethylene.

The connector 200 includes a plurality of components generally having a coaxial configuration about an axis defined by the center conductor of the coaxial cable. The front nut assembly 300 includes a front body housing 310 supporting a pin assembly 322 therein. Specifically, the front body housing 310 is formed with an axial bore configured to cooperatively contain the pin assembly 322 and is made from an electrically conductive material such as aluminum, brass, or the like. The front body housing 310 is formed with an external threaded portion 326 at its forward end and a rearward external threaded portion 328 opposite the forward threaded portion 326. The forward threaded portion 326 is configured to cooperate with devices located in the field that receive the forward end of the pin assembly 322. An O-ring 320 may be provided around the forward threaded portion 326 to improve the seal that is made with a device. A portion of the exterior perimeter of the front body housing 310 may be provided with a hexagonal shape to accommodate the use of tools during installation. An insulative (i.e., non-conductive) body 312 maintains the position of the pin assembly 322 in the front body housing 310. A seizure bushing 316 is urged forward into the front nut housing 310 by a conductive portion, for example a tubular metal portion, for example a mandrel 424 of the back nut assembly 400 (described below) during assembly and compresses a gripping portion 314 in the pin assembly 322 around the center conductor of the coaxial cable. The seizure bushing 316 has an extension 332 that extends into a groove 334 in the front body housing 310 to limit axial movement of the seizure bushing 316.

The rearward threaded portion 328 of the front nut assembly 300 is configured to cooperate with the back nut assembly 400. Specifically, the rearward threaded portion 328 includes a rim face 330 that cooperates with the mandrel 424 of the back nut assembly 400, as will be described in further detail below. An O-ring 318 may be provided around the rearward threaded portion 328 to improve the seal that is made with the back nut housing 410.

The back nut assembly 400 of the connector 200 includes a nut housing 410 having an axial bore and a compression subassembly rotatably supported within the axial bore. The compression subassembly generally includes the mandrel 424, a holder sleeve 416, a support sleeve 422, a cable gripping ferrule 418, and an O-ring 414 arranged in a coaxial relationship about the central axis of the back nut housing 410. The O-ring 414 is compressed axially by the holder sleeve 416 as the holder sleeve 416 is moved to the right in FIG. 1. This axial compression of the O-ring 414 causes the O-ring 414 to expand radially and form a water-proof seal between the nut housing 410 and the coaxial cable upon assembly. The movement of the holder sleeve 416 to the right in FIG. 1 is limited by a rearward edge 468 of the holder sleeve 416 contacting an internal annular shoulder 458 of the back nut housing 410.

Figure 2:
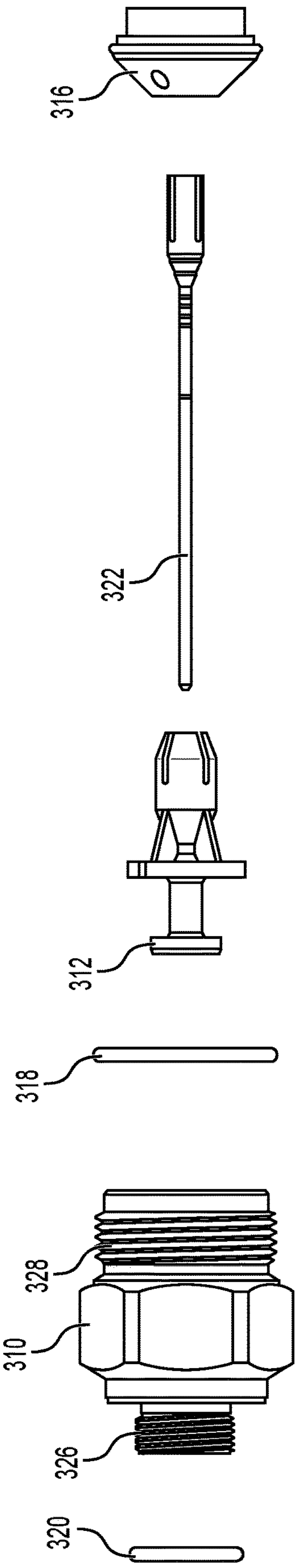
FIG. 2 is a side exploded view of a front nut assembly of the connector of FIG. 1.
Figure 3:
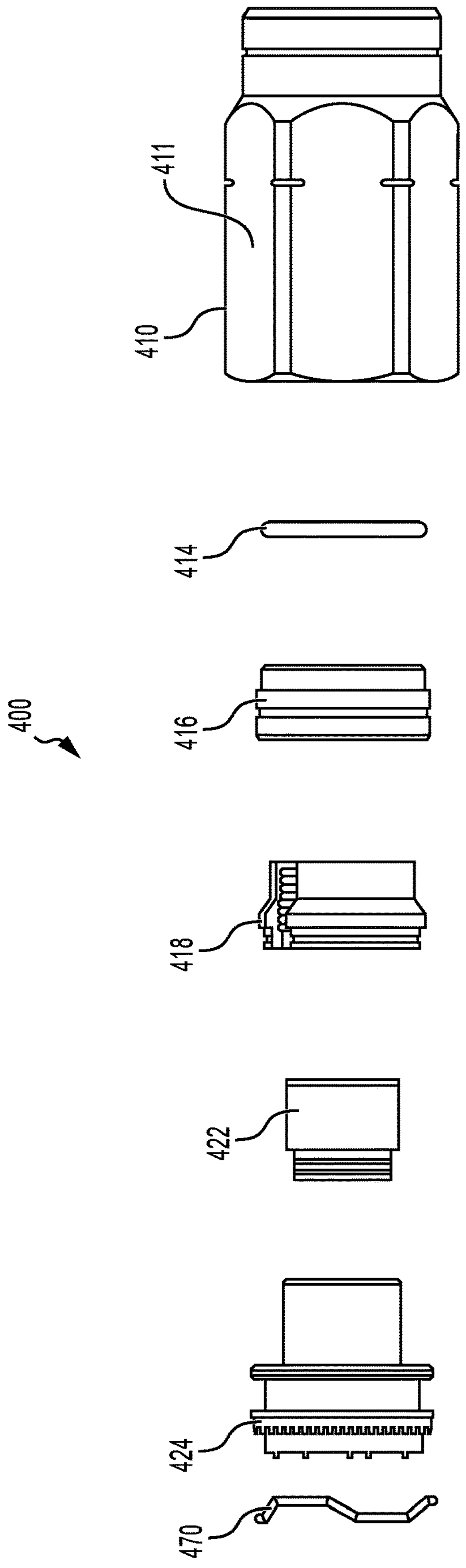
FIG. 3 is an exploded side view of a back nut assembly of the connector of FIG. 1.

FIG. 2 shows an exploded view of the components of the front nut assembly 300, and FIG, 3 shows an exploded view of the components of the back nut assembly 400.

The back nut housing 410 is made from an electrically conductive material, such as aluminum, brass, or the like, and includes a forward internally threaded portion 452 configured to cooperate with the rearward threaded portion 328 of the front body housing 310 so that the two connector portions may be threadedly coupled together. The exterior surface of the back nut housing 410 is preferably provided with a hexagonal shape 411 to accommodate the use of tools to facilitate such threaded coupling.

Figure 4:
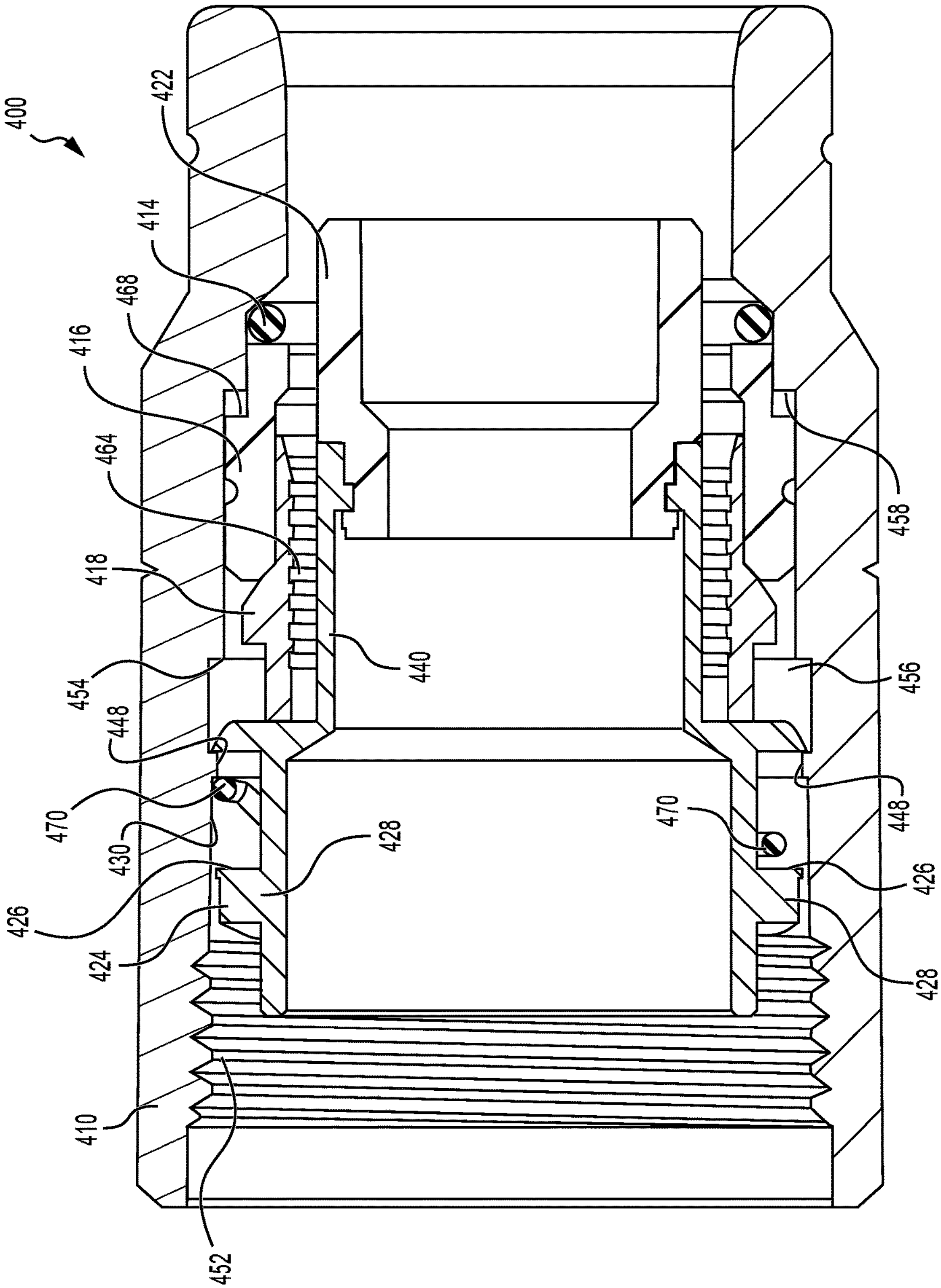
FIG. 4 is a side cross-sectional view of the back nut assembly of the connector of FIG. 1.

As shown in FIG. 4, at its rearward end, the back nut housing 410 is formed with an axial bore dimensioned to receive the outside diameter of the coaxial cable in snug fitting relationship. At its forward end, opposite the rearward end, the back nut housing 410 is formed with a forward axial bore communicating with the rearward axial bore and dimensioned to accommodate the outer diameter of the mandrel 424. For example, the internal surface of the back nut housing 410 may include an annular lip 448 and an annular shoulder 454 that define an annular groove 456 having an axial dimension. The mandrel 424 has a radial extension 428 that extends outwardly from the mandrel 424. The radial extension 428 has a rear face 426 that opposes the annular lip 448 that extends inwardly from the back nut housing 410. A biasing portion, for example a biasing ring 470, is located in a radial direction between the back nut housing 410 and the mandrel 424, and in an axial direction between the rear face 426 and the annular lip 448.

Figure 5:
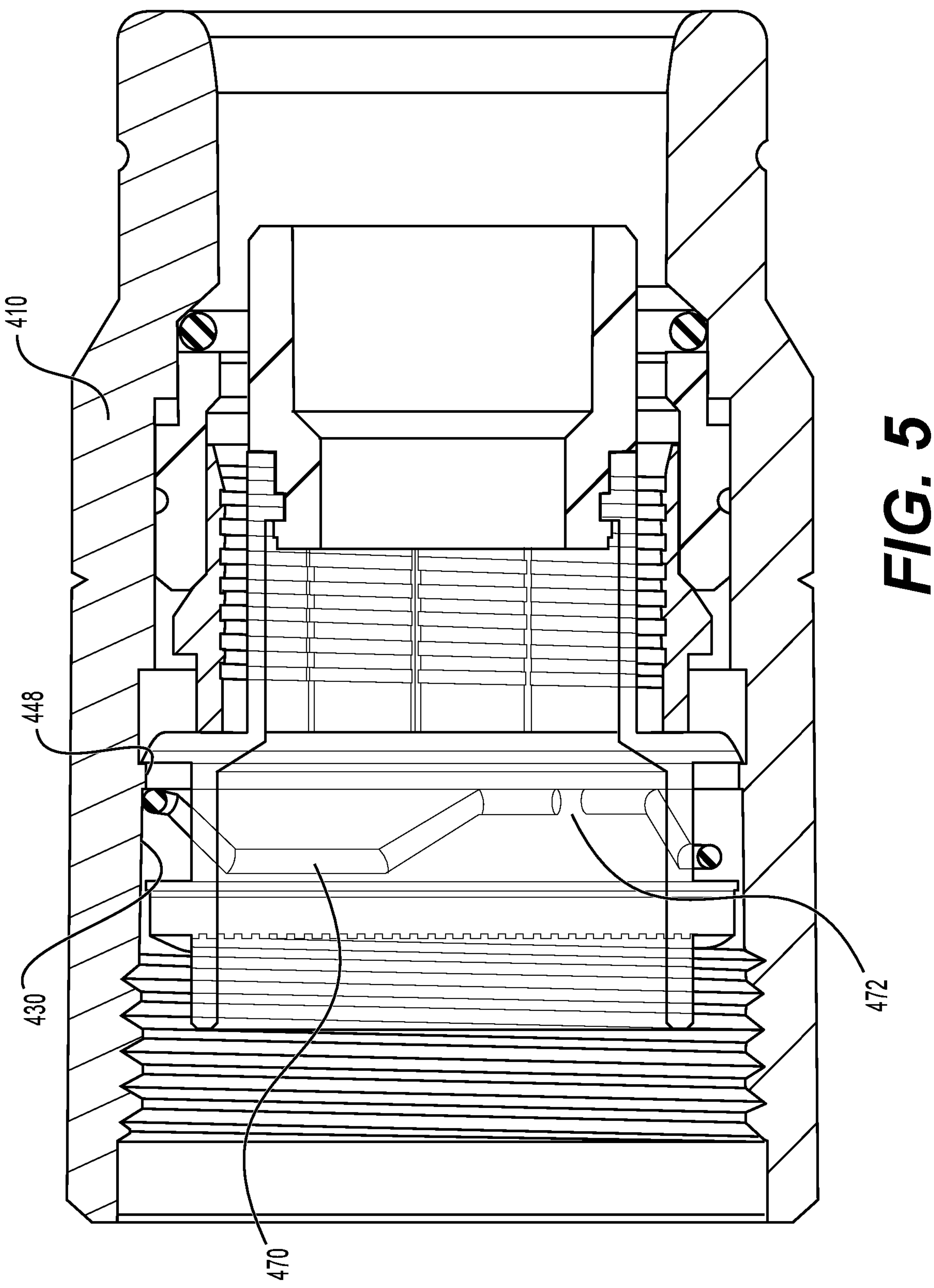
FIG. 5 is a side cross-sectional view of the back nut assembly of the connector of FIG. 1.
Figure 6:
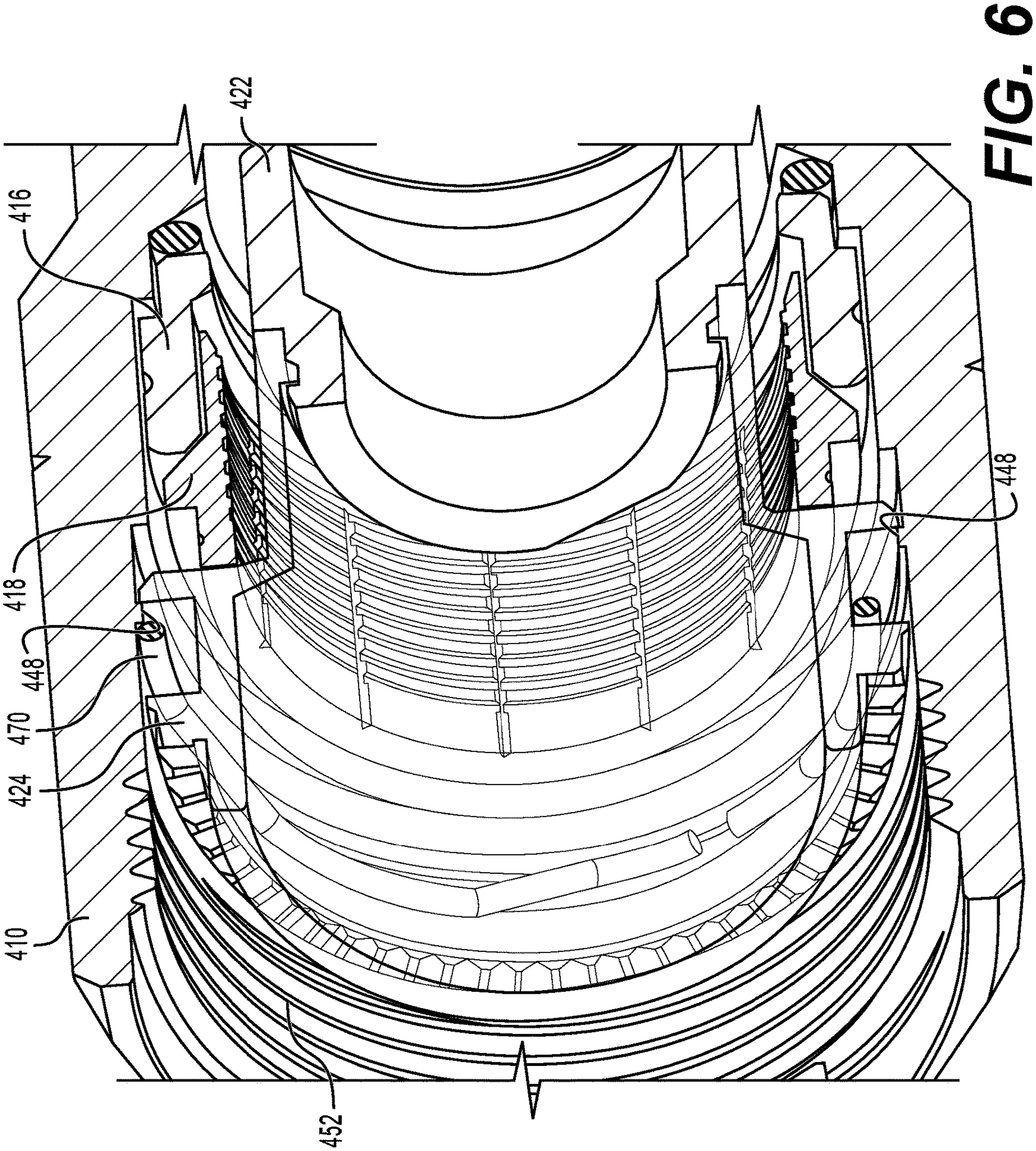
FIG. 6 is a partial perspective cross-sectional view of the back nut assembly of FIG. 4.

In this example, the biasing ring 470 has a gap 472 (shown in FIGS. 7-9) that allows the biasing ring 470 to be expanded radially so that it can be positioned on the mandrel 424 during assembly. The gap 472 also allows the biasing ring to be sized such that its perimeter in an uninstalled, rest position is larger than the inner diameter of an inner surface 430 of the back nut housing 410 that is located forward of the annular lip 448. This size difference results in the biasing ring 470 urging its outer perimeter into contact with the inner surface 430 of the back nut housing 410 in the installed position. Also, in embodiments, the biasing ring 470 is sized such that, in the installed position, inside surfaces of the ring 470 contact the mandrel 424 to locate the mandrel 424 radially centrally within the back nut housing 410. FIG. 5 is similar to FIG. 4, except that the mandrel 424 is shown in a transparent manner so that the biasing ring 470 can be seen more clearly. FIG. 6 is a partial sectional view with the mandrel 424 shown in a transparent manner so that the biasing ring 470 can be seen more clearly.

Figure 7:
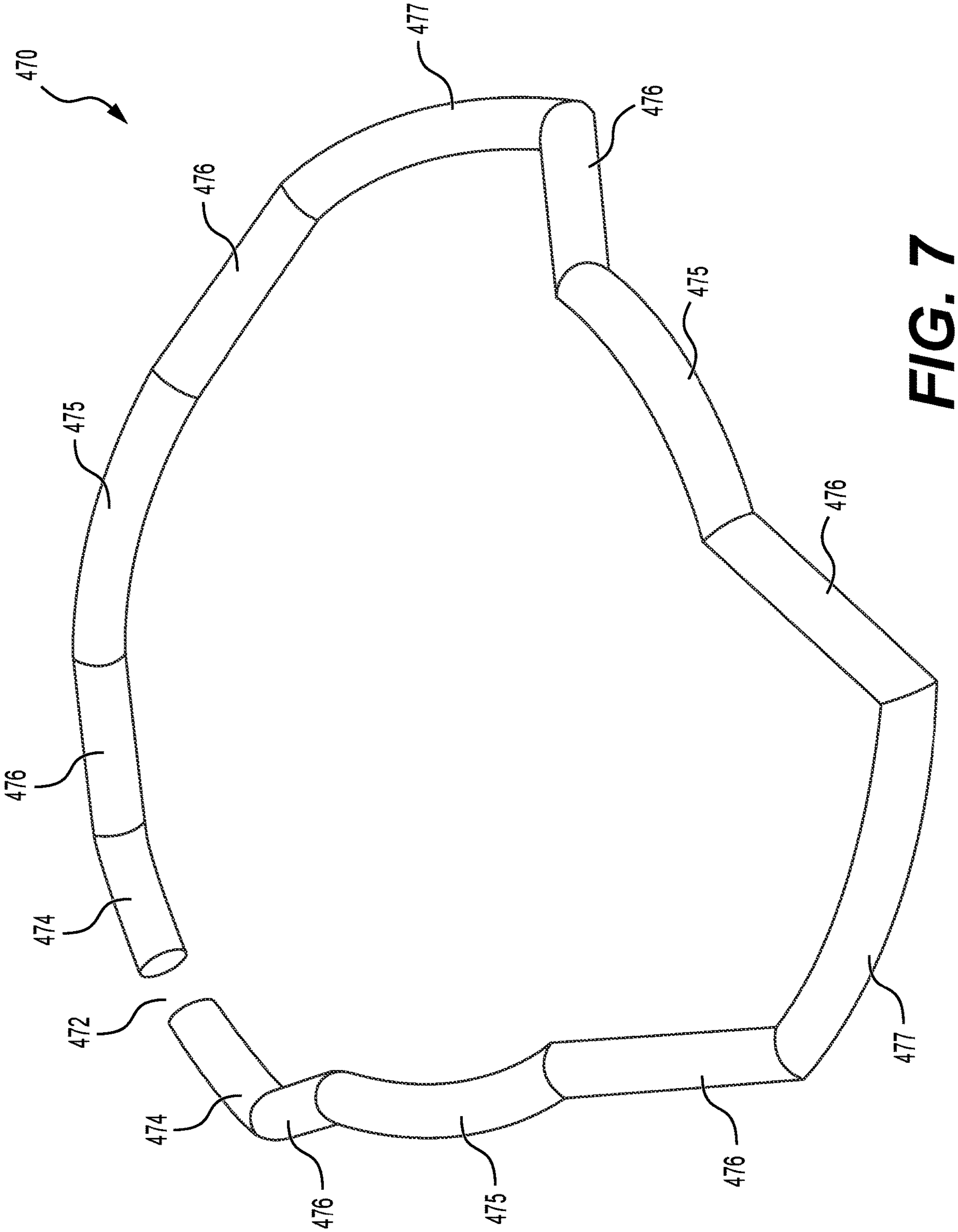
FIG. 7 is a perspective view of a biasing ring of the connector of FIG. 1.
Figure 8:
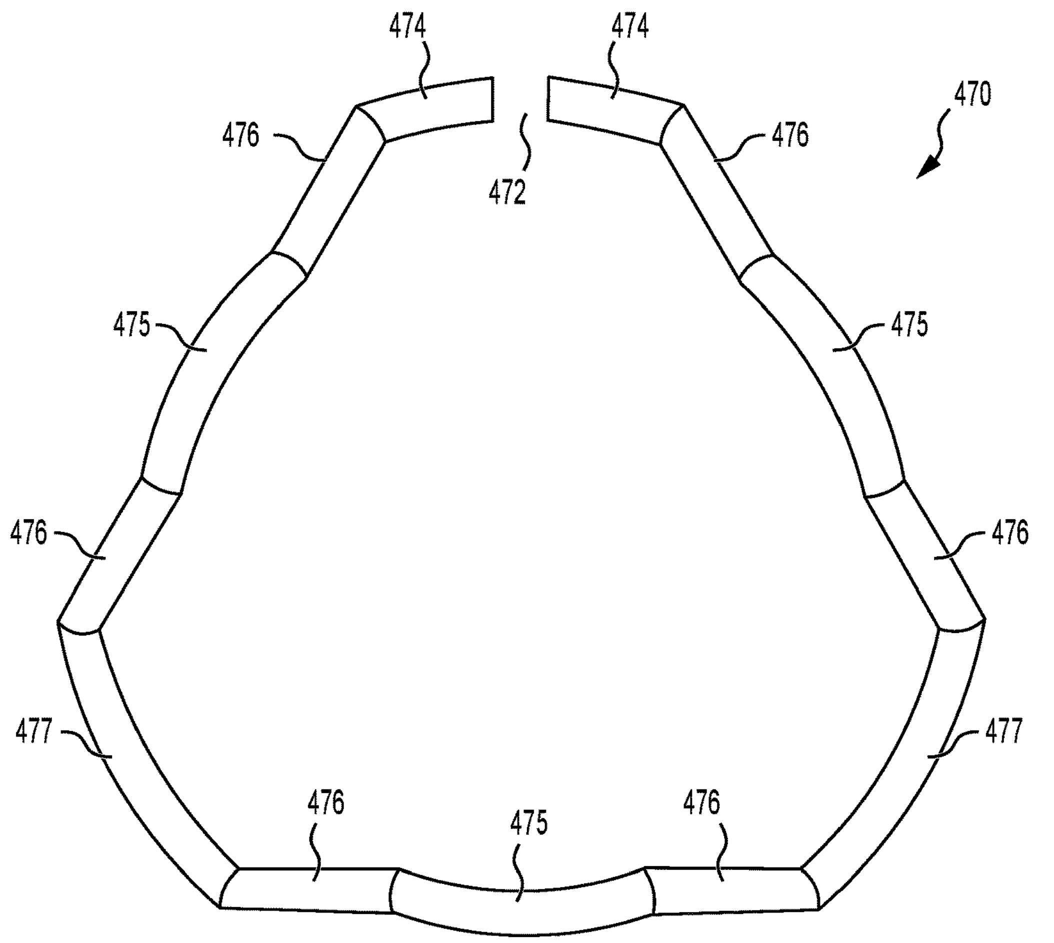
FIG. 8 is a side view of the biasing ring of FIG. 7.
Figure 9:
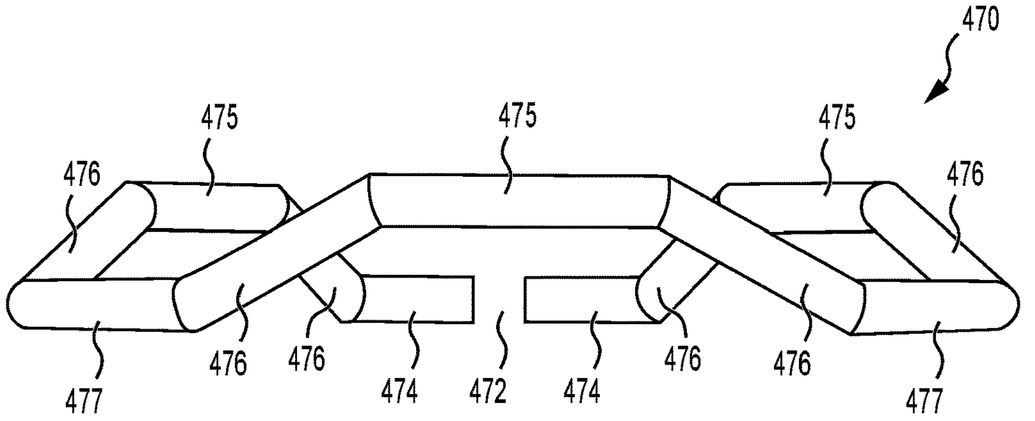
FIG. 9 is a front view of the biasing ring of FIG. 7.

FIGS. 7-9 show an example of the biasing ring 470. The biasing ring 470 is made of a material that is elastically deformable, such as a metallic spring material. The biasing ring 470 is preferably made of an electrically conductive material to provide an electrical grounding path between the mandrel 424 and the back nut housing 410. In this example, the biasing ring 470 has three mandrel contacting sections 475 that each have an inner surface that contacts an outer surface of the mandrel 424. In this example, the biasing ring 470 has two nut housing contacting sections 477 that each have an outer surface that contacts the inner surface 430 of the back nut housing 410. In this example, the biasing ring 470 has two nut housing contacting sections 474 that are adjacent to the gap 472 and that each have an outer surface that contacts the inner surface 430 of the back nut housing 410. In this example, the biasing ring 470 has six transition sections 476 that connect the nut housing contacting sections 474, 477 to the mandrel contacting sections 475. Other embodiments have fewer or more mandrel contacting sections, nut housing contacting sections, and/or transition sections. In this example, the biasing ring 470 is one continuous piece of material. In other embodiments, the biasing ring 470 is a plurality of pieces connected together to form the biasing ring 470. The biasing ring 470 is not limited to the specific shape shown in the Figures such that other embodiments have biasing rings 470 of different shapes.

Figure 10:
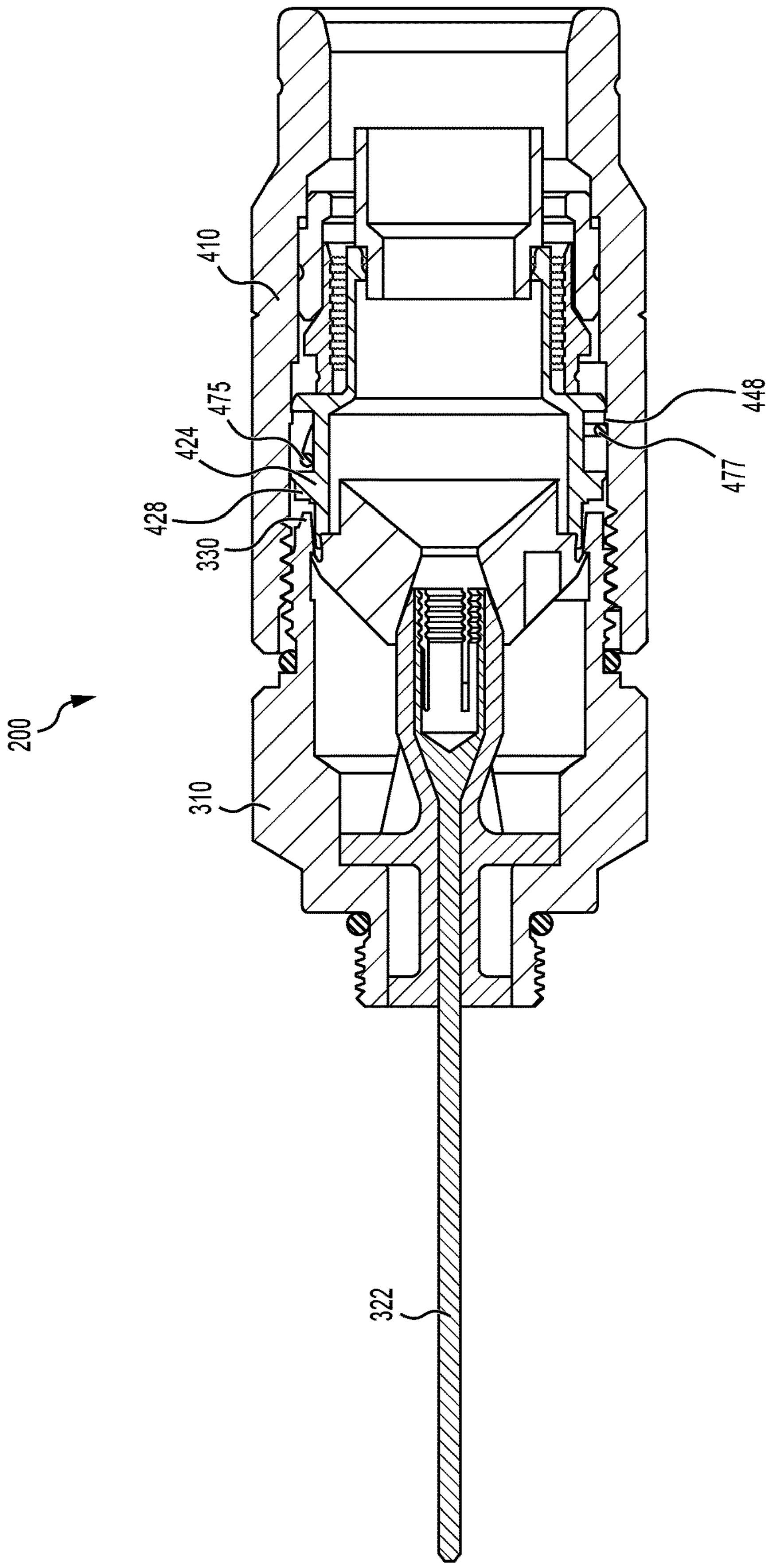
FIG. 10 is a side cross-sectional view of the connector of FIG. 1 in a connected state.

FIG. 10 shows the connector 200 in a partially assembled state. In FIG. 10, the front nut housing 310 is threaded into the back nut housing 410 to a point where the rim face 330 of the front nut housing 310 is approaching the radial extension 428 of the mandrel 424. As the front nut housing 310 is threaded further into the back nut housing 410, the rim face 330 will contact the radial extension 428 due to axial biasing of the mandrel 424 by the biasing ring 470. As the front nut housing 310 is threaded into a fully assembled position in back nut housing 410, the biasing ring 470 presses on both the radial extension 428 and the annular lip 448 to bias the mandrel 424 toward the rim face 330 of the front nut housing 310. For example, the nut housing contacting sections 477, 474 contact the annular lip 448, and the mandrel contacting sections 475 contact the rim face 330. FIG. 9 shows that the nut housing contacting sections 477, 474 have surfaces on a first plane (at the bottom of FIG. 9). The biasing ring 470 contacts the annular lip 448 along this first plane. FIG. 9 also shows that the mandrel contacting sections 475 have surfaces on a second plane (at the top of FIG. 9). The biasing ring 470 contacts the radial extension 428 along this second plane.

Along with the above-described locating features of the biasing ring 470, the biasing ring 470 also secures an electrically conductive contact between the mandrel 424 and the front nut housing 310 such that a constant grounding path exists through the mandrel 424 and the front nut housing 310. In embodiments, the biasing ring 470 improves an electrically conductive connection between the mandrel 424 and the front nut housing 310 when the front nut housing 310 is loosely coupled to the back nut housing 410, and when the front nut housing 310 is fully tightened to the back nut housing 410.

The mandrel 424 includes a tubular body 440. The mandrel 424 may be made from a conductive metal. The outside diameter of the tubular body 440 of the mandrel 424 is dimensioned to be fitted within the inner diameter of the outer conductor of the coaxial cable. Also, the inside diameter of the tubular body 440 is dimensioned to provide a passageway to receive the center conductor of the cable after the cable has been prepared for termination, wherein a length of the dielectric has been removed from the forward end of the cable.

The support sleeve 422 is a tubular body made from plastic. The outside diameter of the support sleeve 422 is dimensioned to be fitted within the inner diameter of the outer conductor of the coaxial cable. Also, the inside diameter of the support sleeve 422 is dimensioned to provide a passageway to receive the center conductor of the cable after the cable has been prepared for termination, wherein a length of the dielectric has been removed from the forward end of the cable. The metal mandrel 424 has an axial length that extends into the gripping ferrule 418. The plastic support sleeve 422 has an axial length that extends from the metal mandrel 424 within the gripping ferrule 418 to the rearward axial bore of the back nut housing 410.

The holder sleeve 416 is preferably made from an electrically conductive material, such as aluminum or brass, and includes a sleeve body having an exterior surface configured to be received within the forward axial bore of the back nut housing 410. The sleeve body terminates at a rearward edge 468, which is configured to engage the annular shoulder 458 of the back nut housing 410.

The cable gripping ferrule 418 is generally in the form of a split tube having an axial gap extending the full length of the ferrule. The gap permits the diameter of the ferrule 418 to be reduced more easily so that the ferrule can be uniformly, radially compressed around the mandrel 424 and the support sleeve 422 upon rearward axial movement of the mandrel 424. An inner surface 464 of the gripping ferrule is preferably provided with structure to enhance gripping of the outer surface of the cable. Such structure may include internal threads, teeth or some other form of textured surface.

Operation and installation of the connector 200 will now be described. Initially, the end of the coaxial cable that is to be inserted into the rearward end of the back nut housing 410 is prepared in a conventional manner. In particular, cable preparation entails removing about 0.75 inch (19.05 mm.) of the cable dielectric, the outer cable conductor and the cable jacket to expose a portion of the center conductor that will engage the pin assembly 322 of the front nut assembly 300. In addition, about 1.25 inches (31.75 mm.) of the cable dielectric is removed from within the outer cable conductor to provide clearance for the installation of the mandrel 424 and the support sleeve 422, and about 0.5 inch (12.70 mm.) of the cable jacket is removed to make an electrical connection with the inside surface of the cable gripping ferrule 418. After the cable end is prepared, it is inserted through the back nut housing 410 so that the portion of the center conductor engages the gripping portion 314 of the pin assembly 322.

The back nut housing 410 is next threadedly coupled and rotated with respect to the front nut housing 310 to translate the front nut and back nut assemblies 300, 400 together along their central axes. As the front nut and back nut assemblies 300, 400 are translated closer together, the rim face 330 of the front nut housing 310 engages radial extension 428 of the mandrel 424 to translate the mandrel 424 towards the rear of the back nut housing 410 such that rearward translation of the mandrel 424 axially compresses the biasing ring between the radial extension 428 and the annular lip 448. In the fully assembled state, the biasing ring exerts an urging force on the rear face 426 of the radial extension 428 to maintain pressure between the rim face 330 of the front nut housing 310 and the radial extension 428 of the mandrel 424.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A cable connector comprising:

a back housing that comprises a rearward cable receiving end and a forward end opposite the rearward end;

a front assembly configured to be coupled with the forward end of the back housing;

a tubular metal portion configured to be supported within the back housing and that comprises a rearward end portion;

a biasing portion configured to be received in a recess in an outer surface of the tubular metal portion;

wherein the biasing portion comprises a plurality of tubular metal portion contacting sections and a plurality of back housing contacting sections;

wherein the back housing comprises an annular lip configured to protrude inwardly from an inner surface of the back housing;

wherein the tubular metal portion comprises a radial extension configured to extend outwardly from a surface of the tubular metal portion;

wherein, in an assembled state, the biasing portion is configured to be compressed in an axial direction between the radial extension and the annular lip;

wherein, in the assembled state, the biasing portion is configured to radially center the tubular metal portion in the back housing; and wherein the biasing portion is configured to urge the tubular metal portion into contact with the front assembly to provide a secure electrical grounding path between the tubular metal portion and the front assembly.

2. The cable connector of claim 1, wherein the tubular metal portion comprises a mandrel.

3. The cable connector of claim 1, wherein the cable connector comprises a coaxial cable connector.

4. The cable connector of claim 1, wherein the biasing portion comprises a biasing ring.

5. The cable connector of claim 1, wherein the back housing comprises a back nut housing.

6. The cable connector of claim 1, wherein the front assembly comprises a front nut assembly.

7. The cable connector of claim 1, wherein the gripping portion comprises a tubular gripping ferrule.

8. The cable connector of claim 1, wherein the holder portion comprises a tubular holder sleeve.

9. The cable connector of claim 1, wherein the recess comprises a groove.

10. The cable connector of claim 1, wherein a compression assembly is configured to radially compress an outer conductor of a cable against the tubular metal portion.

11. The cable connector of claim 10, wherein the compression assembly comprises a gripping portion configured to radially surround the tubular metal portion and a holder portion configured to radially surround at least a portion of the gripping portion.

12. The cable connector of claim 1, wherein the biasing portion is configured to provide a secure electrical grounding path between the tubular metal portion and the front assembly when the front assembly is loosely coupled to the back housing, and when the front assembly is fully tightened to the back housing.

13. A cable connector comprising:

a back portion comprising a rearward cable receiving end and a forward end opposite the rearward end;

a tubular metal portion configured to be supported within the back portion and comprising a rearward end portion;

a biasing portion configured to be received by a receiving portion in the tubular metal portion;

wherein the back portion comprises a retaining portion;

wherein the tubular metal portion comprises an extension portion configured to extend outwardly from the tubular metal portion;

wherein, in an assembled state, the biasing portion is configured to be compressed in an axial direction between the extension portion and the retaining portion;

wherein the biasing portion is configured to urge the tubular metal portion into contact with a front assembly to maintain an electrical grounding path between the tubular metal portion and the front assembly; and wherein the biasing portion is configured to maintain an electrical grounding path between the tubular metal portion and the front assembly when the front assembly is loosely coupled to the back portion, and when the front assembly is fully tightened to the back portion.

14. The cable connector of claim 13, further comprising a front assembly configured to be coupled with the forward end of the back portion.

15. The cable connector of claim 13, wherein the back portion comprises a back nut housing, and the front assembly comprises a front nut assembly.

16. The cable connector of claim 13, wherein the biasing portion is configured to comprise a plurality of tubular metal portion contacting sections and a plurality of back portion contacting sections.

17. The cable connector of claim 13, wherein the receiving portion is configured to be located in an outer surface of the tubular metal portion.

18. The cable connector of claim 13, wherein the retaining portion comprises an annular lip configured to protrude inwardly from an inner surface of the back portion.

19. The cable connector of claim 13, wherein the extension portion comprises a radial extension.

20. The cable connector of claim 13, wherein, in the assembled state, the biasing portion is configured to radially center the tubular metal portion in the back portion.

21. A cable connector comprising:

a back portion comprising a rearward end and a forward end opposite the rearward end;

a conductive portion configured to be supported within the back portion and comprising a rearward end portion;

a biasing portion configured to be received by the conductive portion;

wherein, in an assembled state, the biasing portion is configured to be compressed in an axial direction between the conductive portion and the back portion;

wherein the biasing portion is configured to urge the conductive portion into contact with a front assembly to maintain an electrical grounding path between the conductive portion and the front assembly; and wherein the biasing portion is configured to maintain an electrical grounding path between the conductive portion and the front assembly when the front assembly is loosely coupled to the back portion, and when the front assembly is fully tightened to the back portion.

22. The cable connector of claim 21, wherein the back portion comprises a retaining portion, and the conductive portion comprises an extension portion configured to extend outwardly from the conductive portion.

23. The cable connector of claim 21, wherein, in the assembled state, the biasing portion is configured to be compressed in an axial direction between the extension portion and the retaining portion.

24. The cable connector of claim 21, wherein the biasing portion is configured to comprise a plurality of conductive portion contacting sections and a plurality of back portion contacting sections.

25. The cable connector of claim 21, wherein the conductive portion comprises a tubular metal portion.

26. The cable connector of claim 21, wherein the biasing portion comprises a biasing ring.

27. The cable connector of claim 21, wherein the back portion comprises a back nut housing.

28. The cable connector of claim 21, wherein the front assembly comprises a front nut assembly.

* * * * *